United States Patent [19]

Krieder

[11] 4,419,729

[45] Dec. 6, 1983

[54] AUTOMATIC SPEED CONTROL FOR HEAVY VEHICLES

[75] Inventor: Robert D. Krieder, Sullivan, Ohio

[73] Assignee: The Bendix Corporation, Southfield, Mich.

[21] Appl. No.: 200,798

[22] Filed: Oct. 27, 1980

[51] Int. Cl.³ .................... G06G 7/70; B60K 31/00
[52] U.S. Cl. ............................ 364/426; 123/352; 180/176; 364/164
[58] Field of Search ............. 364/424, 426; 180/176, 180/282, 179; 123/352

[56] References Cited

U.S. PATENT DOCUMENTS

| | | | |
|---|---|---|---|
| 3,332,406 | 7/1967 | Perry et al. | 180/282 |
| 3,455,411 | 7/1969 | Carp et al. | 180/176 |
| 3,485,316 | 12/1969 | Slavin et al. | 180/176 |
| 3,570,622 | 3/1971 | Wisner | 180/176 |
| 3,599,052 | 8/1971 | Carp et al. | 180/176 |
| 3,648,798 | 3/1972 | Jania | 180/176 |
| 3,715,006 | 2/1973 | Walsh et al. | 180/176 |
| 3,727,517 | 4/1973 | Slavin et al. | 91/361 |
| 3,794,389 | 2/1974 | Davis et al. | 303/106 |
| 3,966,011 | 6/1976 | Minami et al. | 180/176 |
| 3,978,837 | 9/1976 | Lundberg | 123/357 |
| 3,983,954 | 10/1976 | Noddings et al. | 180/179 |
| 4,010,674 | 3/1977 | Noddings et al. | 91/47 |
| 4,072,206 | 2/1978 | Larson et al. | 180/176 |
| 4,094,378 | 6/1978 | Scheyhing et al. | 180/176 |
| 4,118,774 | 10/1978 | Franke | 364/431 |
| 4,121,273 | 10/1978 | Jarrett | 180/176 X |
| 4,202,424 | 5/1980 | Sakakibara et al. | 180/176 |
| 4,286,685 | 9/1981 | Rudolph et al. | 180/176 |
| 4,337,511 | 6/1982 | Schneider et al. | 364/426 |

FOREIGN PATENT DOCUMENTS 2436982 12/1976 Fed. Rep. of Germany .
2254721 1/1978 France .

*Primary Examiner*—Felix D. Gruber
*Attorney, Agent, or Firm*—William A. Marvin; Ken C. Decker

[57] ABSTRACT

An automatic speed control for a heavy duty vehicle includes a controller which regulates communication between a compressed air source and an air actuated throttle mechanism. The controller generates a control signal which is a function of a speed error signal and the position of the air actuated throttle to regulate the compressed air source. The speed error signal is calculated as the difference between a commanded speed signal and an actual speed signal. To generate the control signal, the error signal and throttle position signal are operated on by different lead-lag transfer functions. These lead-lag terms are thereafter combined with a proportional speed error term to yield the desired control signal. The system further includes a throttle control feature for powering auxiliary equipment when the actual speed signal is zero. Another feature of the control limits the commanded speed signal to a set value when it exceeds a predetermined limit.

13 Claims, 20 Drawing Figures

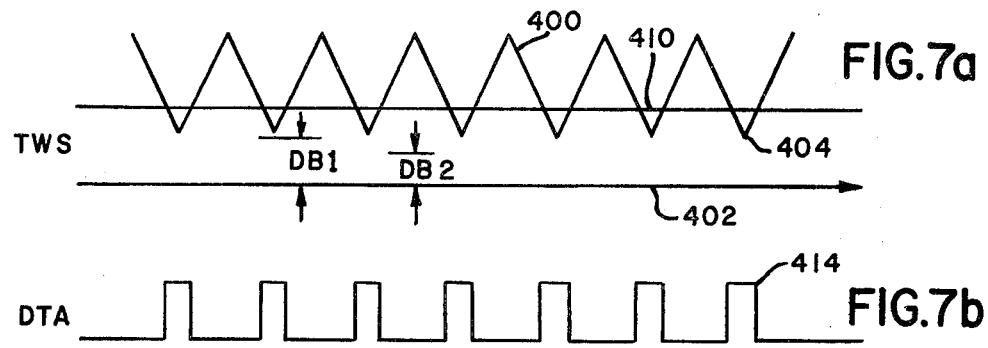
FIG. 7a
FIG. 7b
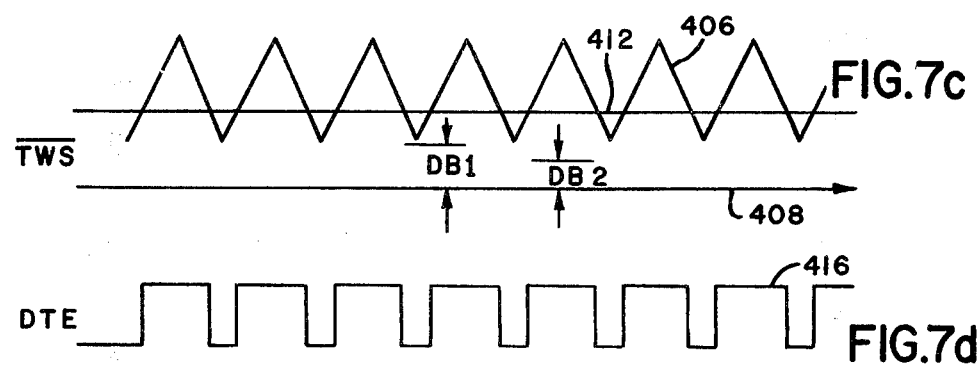
FIG. 7c
FIG. 7d
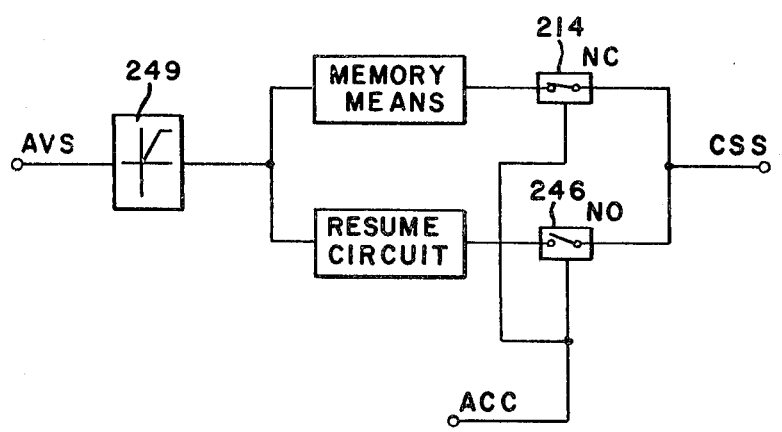
FIG. 4a

AUTOMATIC SPEED CONTROL FOR HEAVY VEHICLES

BACKGROUND OF THE INVENTION

The invention pertains generally to automatic speed controls for vehicles and is more particularly directed to such systems for use in trucks, off-road vehicles, construction equipment, and other vehicles that use a heavy duty diesel engine.

Cruise control has become an increasingly popular option on passenger cars in recent years. The cruise control or automatic speed control option permits the vehicle operator to maintain a predetermined speed while being able to remove his foot from the accelerator pedal. The cruise control option has an obvious advantage in reducing driver fatigue and also providing a marginal increase in fuel economy since a steady speed is maintained and the vehicle is not repeatedly accelerated and decelerated. Heavy duty vehicles such as trucks are commonly used on long-distance routes and this inherent advantage of cruise control is increased for these vehicles. However, until recently heavy vehicles have not been equipped with speed or cruise control devices. A cruise control for heavy vehicles is disclosed in U.S. Pat. No. 4,286,685 filed in the names of Rudolph et al on May 23, 1979, and which is commonly assigned with the present application. The disclosure of Rudolph et al is expressly incorporated by reference herein.

One problem with providing heavy vehicles with a speed control system is that compared to passenger cars, trucks are relatively under-powered and do not have the capability to accelerate quickly in order to maintain the speed set by an automatic speed control. This is because the horsepower/mass ratio in trucks is much different than in passenger cars and therefore, the heavy vehicle speed control must compensate for this difference. Additionally, the horsepower/mass ratios for a truck may vary over a wide range whereby in one instance the truck may be required to pull a fully loaded trailer while in another instance may only be required to travel without a trailer attached. Still further, the number of gears in a heavy vehicle varies considerably compared with the normal three or four for the normal passenger vehicle. For these reasons the heavy vehicle speed control must be more sophisticated than the automotive speed control.

The heavy vehicle speed control must also cooperate with the fuel control of the particular engine environment in which it is incorporated. Most heavy vehicles today are equipped with diesel engines. When accompanying a diesel engine the control must interface advantageously with a fuel control and not just a throttle control as in a passenger car. The fuel control of a diesel engine is essentially a governor device that can be divided into two types. The first general type of diesel governor is a min-max governor and the second type is an all-speed governor.

The min-max governor does not initiate a governing or limiting action unless the engine of the vehicle is operated above its maximum speed or below its minimum speed. Therefore, a heavy vehicle automatic speed control has a wide range of engine speeds it can use to regulate the vehicle velocity without the fuel governor recognizing its presence. The min-max governor is therefore relatively compatible with an automatic speed control. More problematic is the all-speed governor which attempts to maintain a certain engine speed for a particular throttle setting. Normally, an automatic speed control will regulate the throttle position of a heavy vehicle in response to a control signal indicating an error between the actual vehicle speed and the desired or commanded vehicle speed. If the throttle position is moved too quickly the all-speed governor will constantly counteract the action and hunt to bring the system back into equilibrium. This produces an instability where the speed control and all-speed governor are mismatched. The cruise control must work with and not against these mechanical feedback systems when on diesel engines. Prior to this time there has not been a heavy vehicle speed control with a control theory that is compatible with the operation of the diesel engine which may use either of these governors.

A still further desired feature to be included in an automatic speed control for heavy vehicles is a top set limit. Typically, this limit will prevent an operator from operating the automatic speed control at a vehicle speed that is greater than the limit. For example, this top set limit could be the national 55 miles an hour speed limit to encourage participation in the national goals of reducing highway accidents and conserving energy. However, this top set limit should not in any way interfere with the control by a driver over his vehicle. Any top set limit that becomes a governor and does not allow the operator the choice of exceeding the limit could create an unwanted or dangerous situation.

SUMMARY OF THE INVENTION

The invention provides an improved automatic speed control for heavy duty vehicles. The control comprises a cruise control circuit for maintaining a steady vehicle speed when the vehicle is in motion. This circuit, generates a control signal to a duty cycle generator which regulates the pressure in a plenum. Preferably, the pressure level in the plenum controls a pneumatic actuator which positions a throttle member in the fuel delivery system of a diesel engine. The diesel engine may include a governor of either the min-max or all-speed type.

The cruise control circuit synthesizes a cruise control signal from a speed error signal that is applied as a proportional input to a summing junction. A negative feedback input to the summing junction is developed by a throttle position signal that is operated on by a lead-lag network. The lead-lag network produces an anticipatory input for changes in the throttle position which thereafter decays with the time constant of the lag term. A second negative feedforward input to the summing junction is provided by a lead-lag network operating on the speed error signal of the controller.

The proportional term is utilized to control the position of the throttle member such that the speed error term is directed to zero. However, for large rapid changes in the speed error signal the proportional term is reduced by the second feedforward term to limit the response of the controller and maintain stability. Likewise, if after the initial feedforward signal is subtracted, the change in throttle position required is still too large, then the throttle feedback term reduces the control signal to maintain stability.

The lag term in the transfer function of each term maintains a history of the changes in speed error and throttle position but these decay with the time constant of each lag. The history terms are therefore essentially zero after a few time constants and thus do not interfere with the control if the vehicle changes from an under-speed condition (climbing a hill) to an overspeed condition (descending a hill) or vice versa.

The control law of the cruise control advantageously interfaces the automatic speed control to a diesel engine with a governor when the vehicle is in motion. The control law sustains the vehicle speed at the commanded speed for changes in load, engine speed, gear changes, and other driving conditions while interfacing compatibly with the diesel engine governors.

The cruise control circuit further includes a commanded speed circuit which generates a commanded speed signal. The speed error signal is then derived by differencing this commanded speed signal with an actual speed signal before the cruise control law is generated.

In a preferred form the commanded speed circuit comprises a memory means which is operable to store the actual speed signal in response to an operator command. It further comprises a resume control circuit which is used to accelerate the vehicle to a previously stored commanded speed after a brake application. The resume control circuit may further be used to accelerate the vehicle to a desired speed different than the speed at which the system is operating.

The resume control circuit in both the resume mode and accelerate mode uses a predetermined rate to accelerate the vehicle. The predetermined rate preferably is low enough to prevent skidding on icy or wet pavement. This feature provides automatic control of vehicle speed increases during periods when excessive acceleration is undesirable. Additionally, the commanded speed circuit has a means for limiting the commanded speed signal to a set value if it exceeds a predetermined limit. The limiting means creates a top set limit over which the cruise control will not operate automatically. The desired commanded speed is compared to the predetermined limit, for example 55 MPH, and if less than the limit is transmitted unmodified. However, if the desired commanded speed is equal or greater than the limit, then the limiting means clamps the commanded speed to the limit value. In a preferred embodiment the limiting means receives an input from the output of the memory means and the output of the resume control circuit to limit both operator and system commands to the set value.

In a second embodiment, the limiting means is disposed between the actual speed signal and the input to the memory means. This embodiment would prevent a speed greater than the limit from being memorized therein. In another embodiment, the limiting means is disposed between the actual speed signal and the input to the resume control circuit. This embodiment would prevent the vehicle from being accelerated from an actual speed greater than the limit.

By limiting the commanded speed signal in one of the aforementioned ways the automatic speed control may still maintain a cruise control mode even if the limit has been requested to be exceeded by the system or by the operator. This is advantageous when the operator has accelerated the vehicle beyond the limit for passing, to avoid road hazards, or other reasons and then wishes to resume the limit speed or another previously stored speed below the limit. The limiting action of the controller will allow the operator to coast down to these speeds automatically without resetting the system. Thus, it is not required that the vehicle is actually traveling below the limit speed to set up or maintain the cruise control.

Importantly, the limiting operation when applied to the commanded speed signal does not produce a governing effect on the actual speed of the vehicle. The operator is unhindered to command the operatoractuated part of the throttle to exceed the limit when it is necessary. The limiting action when applied to the commanded speed signal merely prevents the automatic speed control from automatically maintaining an actual speed in excess of the limit.

These and other objects, features, and aspects of the invention will be more clearly understood and better explained if a reading of the detailed disclosure is undertaken in conjunction with the appended drawings wherein:

BRIEF DESCRIPTION OF THE DRAWINGS

FIG. 4a is a schematic block diagram of another embodiment of the commanded speed circuit illustrated in FIG. 4;

FIGS. 7a-d are detailed waveform diagrams representative of the time relationships of the signals at various places in the circuit of the duty cycle translator illustrated in FIG. 6.

DETAILED DESCRIPTION OF THE PREFERRED EMBODIMENT

Figure 1:
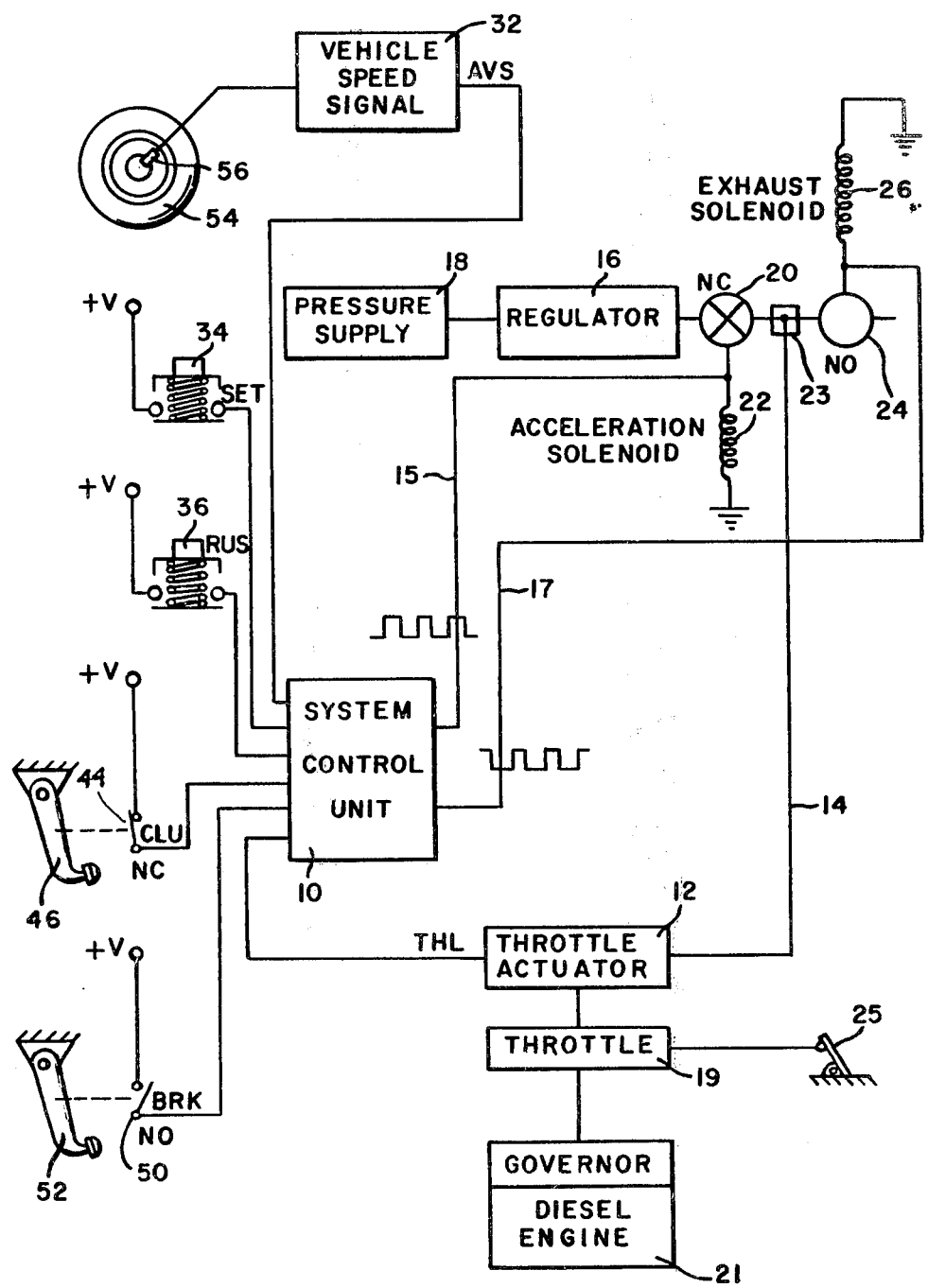
FIG. 1 is a schematic block diagram illustrative of an automatic speed control system constructed in accordance with the invention.

If attention will now be directed to FIG. 1, a detailed description of an automatic speed control system for a heavy vehicle will be fully described. The automatic speed control system includes generally a system control unit 10 which receives inputs from a plurality of sensor signals and operator commands. The system control unit operates on these electrical signals to produce a set of duty cycle control signals output via signal lines 15, and 17 to a pair of solenoids.

An acceleration solenoid is formed by a normally closed valve 20 operably actuated by energizing a coil 22. Similarly, a normally open valve 24, actuated by the energization of a coil 26, forms an exhaust solenoid. The signals generated via signal lines 15 and 17 respectively, control the acceleration solenoid to communicate pressure from a regulator 16 to a plenum 23 and control the exhaust solenoid to exhaust or vent pressure from the plenum 23. Valve 20 opens in response to a high level signal on line 15 while valve 24 opens in response to a low level signal on line 17. By controlling the off and on times of the exhaust and acceleration solenoid it can be seen that the pressure may be varied in the plenum 23 in relationship to the duty cycle of the electrical signals.

The pressure regulator 16 provides a predetermined pressure head from a pressure supply 18 for input to the plenum 23. The pressure supply 18 is also used to actuate the vehicle brakes, and the pressure regulator 16 is conventional. The system control unit 10 uses the electrical control to vary the pressure in plenum 23 to position a pneumatic throttle actuator 12. The pressure signal from the plenum 23 is communicated via conduit 14 to the throttle actuator.

The throttle actuator 12 in combination with an operator-controlled accelerator pedal 25 combine to position a throttle member 19 for a heavy vehicle engine. The accelerator overrides the throttle actuator for higher engine speeds. The heavy vehicle engine in the preferred embodiment of the controller is a diesel engine having either a min-max governor or an all-speed governor. This engine is shown schematically as element 21 in the drawing and includes either of the aforementioned governors.

The system control unit 10 receives as one sensor input an actual vehicle speed signal AVS from a vehicle speed signal circuit 32. The vehicle speed signal circuit converts electrical pulses from a sensor 56 into a voltage level representative of the actual velocity of a rotating member of the vehicle. For example, sensor 56 could sense the rotation of a wheel 54, the vehicle drive shaft, speedometer cable, or other member of the vehicle representative of the actual velocity. Another sensor input to the system control unit 10 is the throttle signal THL generated from the throttle actuator 12. The THL signal is a voltage representative of the actual position of the throttle member 19 as controlled by the pneumatic throttle actuator 12. In the preferred embodiment the throttle actuator contains a potentiometer which provides a linear voltage representation of the position of the throttle member.

Operator inputs to the automatic speed control signal include an operator-actuated "set" button 34 and an operator-actuated "resume" button 36. The "set" button 34 is a spring-loaded push button that will provide a high level logic signal when contact has been accomplished. This high level logic signal when the button is depressed will become the SET signal. A resume signal RUS is generated similarly from the "resume" button 36 when depressed momentarily. The momentary depression of the push button 36 will cause a high level voltage signal from a source of voltage +V to be transmitted to the system control unit.

The clutch and brake pedals of the vehicle are further utilized by the operator to signal the system control unit 10. The clutch 46 and switch 44 produces a clutch signal CLU which transitions from a high voltage level to a low voltage level. The high voltage level when the clutch is engaged is provided by a voltage source +V. When the clutch pedal is depressed it opens switch 44 to provide a low voltage level. Similarly, a brake signal BRK is developed by the brake pedal 52 and switch 50. When the brakes are off a low voltage is developed on the signal line from a source of voltage +V. However, when the brake pedal is depressed by the operator, switch 50 closes to bring the signal line to a high voltage level.

These sensor and operator inputs are then used by the system control unit to logically determine the control of the acceleration and exhaust solenoids and set the pressure level in plenum 23. The pressure level regulates the position of the throttle actuator 12 and consequently the throttle member to control the engine speed as has been previously described. The engine speed varies with respect to load and gearing to maintain a constant vehicle speed when in the cruise control mode.

The SET signal when in cruise control mode is used to memorize the actual vehicle speed in order that the cruise control can regulate the vehicle at that speed. It is also used in a coast mode while being depressed and held to coast to any given actual speed. When in the throttle control mode, the SET signal is used by the controller to decrement the throttle position.

The RUS signal is used to initiate an acceleration back to a previously set speed if the system is in the cruise control mode. Additionally, the resume signal, can be used to accelerate the vehicle to any speed below the top set limit. While in throttle control mode, the RUS signal is used to increment the throttle position.

The BRK signal is used to terminate the cruise control mode while the CLU signal is used to suspend the cruise control mode. Similarly, the CLU signal is used to terminate the throttle control mode. The operation of these signals will be more fully described hereinafter.

Figure 2:
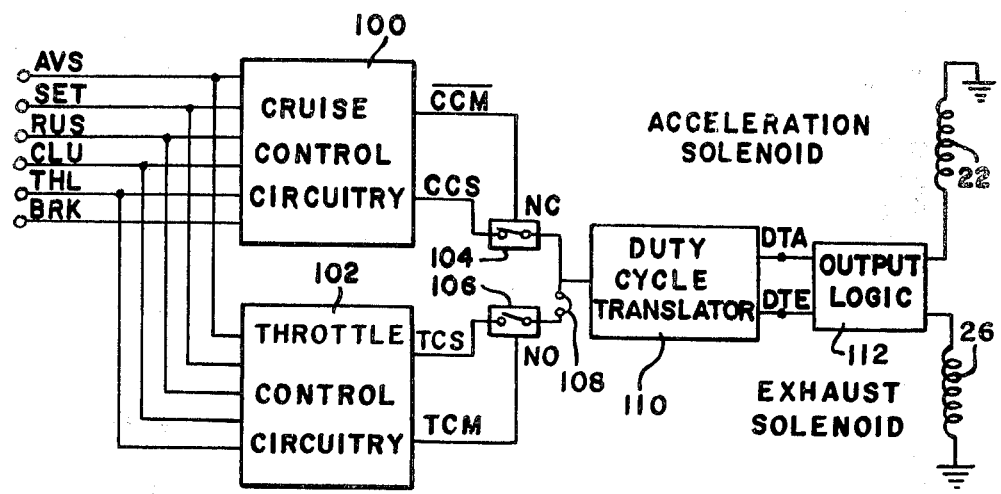
FIG. 2 is a expanded block diagram of the system control unit illustrated in FIG. 1.

With reference now to FIG. 2 a more detailed description of the system control unit 10 will be undertaken. The system control is divided into two main sections including a cruise control circuit 100 and a throttle control circuit 102. The cruise control circuitry receives the input signals as previously described and develops a cruise control signal CCS which is a varying voltage transmitted through a normally closed switch 104 to a duty cycle translator 110. The duty cycle translator 110 converts the varying voltage into two square wave signals DTA and DTE of varying but opposite duty cycles. The duty translator accelerate signal DTA and the duty translator exhaust signal DTE which will be more fully described hereinafter are input to an output logic circuit 112 which inhibits the signals upon certain condition and transmits the control signals to the acceleration solenoid and exhaust solenoid represented schematically by their coils 22 and 26, respectively.

The cruise control circuit further generates a cruise control mode signal CCM that indicates that the automatic speed control is in the cruise control operational mode. The inversion of this signal CCM is used to open the switch 104 when the cruise control circuit determines that the system should not be operating in that mode.

The throttle control circuit 102 acts similarly to the cruise control circuit and generates a throttle control signal TCS. The TCS signal is transmitted through a normally open switch 106 to the duty cycle translator 110. When the switch is closed the duty cycle translator will receive the TCS signal and operate thereon as if it were the CCS signal. The switch 106 is closed by the throttle control circuit determining that the system is in a throttle control mode and generating a throttle control mode signal TCM to the control terminal of the switch.

Thus, it is seen that the system operates to generate control of the acceleration and exhaust solenoids by the mode control signals CCM and TCM closing or opening switches 104, 106 to the duty cycle translator 110. Depending on which switch is closed, the throttle control signal TCS or the cruise control signal CCS is transmitted to the duty cycle translator to operate the system in the manner desired. The circuitry generating the signals CCM, TCM in combination with the switches 104, 106 form a mode control. The input signals previously described to the system are logically combined in these circuits to determine whether the system should be operating in either a cruise control mode or a throttle control mode.

Since switch 104 is normally closed, it is contemplated that the system will generally operate in the cruise control mode. Only when the CCM signal is not present will the switch 104 be opened and the system terminate that mode of operation. Conversely, switch 106 is normally open and only when the TCM signal is present will the system operate in the throttle control mode. At all other times the system will not operate in throttle control mode. The two mode control signals are exclusive and will not be generated at the same time. However, the system may idle and operate in neither mode depending on the input signals. A jumper 108 is provided if the throttle position control is desired only as an option.

As will be more fully described hereinafter the cruise control circuit and throttle control circuit contain different control laws to generate the CCS signal and TCS signal independently of one another. The independent generation of the TCS signal allows the throttle control circuit to utilize a control law that can regulate the throttle position incrementally to a finer resolution than the cruise control circuit. Conversely, the cruise control circuit uses a control law that regulates changes in the throttle position for load and engine speed changes while the vehicle is being driven better than the throttle control circuit. Thus, an advantageous control in cruise control mode can be effected while the vehicle is moving and an advantageous control in throttle control mode may be effected while the vehicle is stationary.

Figure 3C:
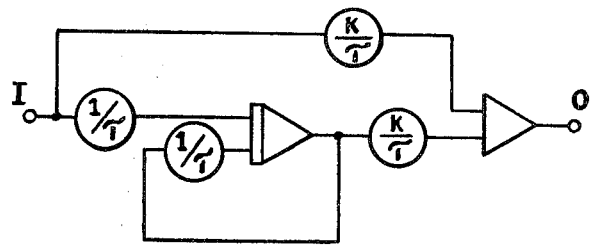
FIG. 3c is a detailed electrical schematic of a circuit implementation of the transfer function circuits illustrated in FIG. 3.
Figure 3A:
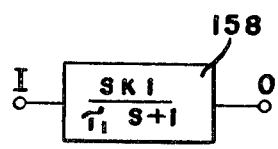
FIGS. 3a and 3b are pictorial representations in Laplace transform notation of specific implementations of the transfer function circuits illustrated in FIG. 3.
Figure 3D:
FIGS. 3d and 3e are waveform diagrams of an input function and its response for the transfer function circuits illustrated in FIG. 3.
Figure 3B:
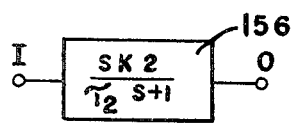
Figure 3E:
Figure 3:
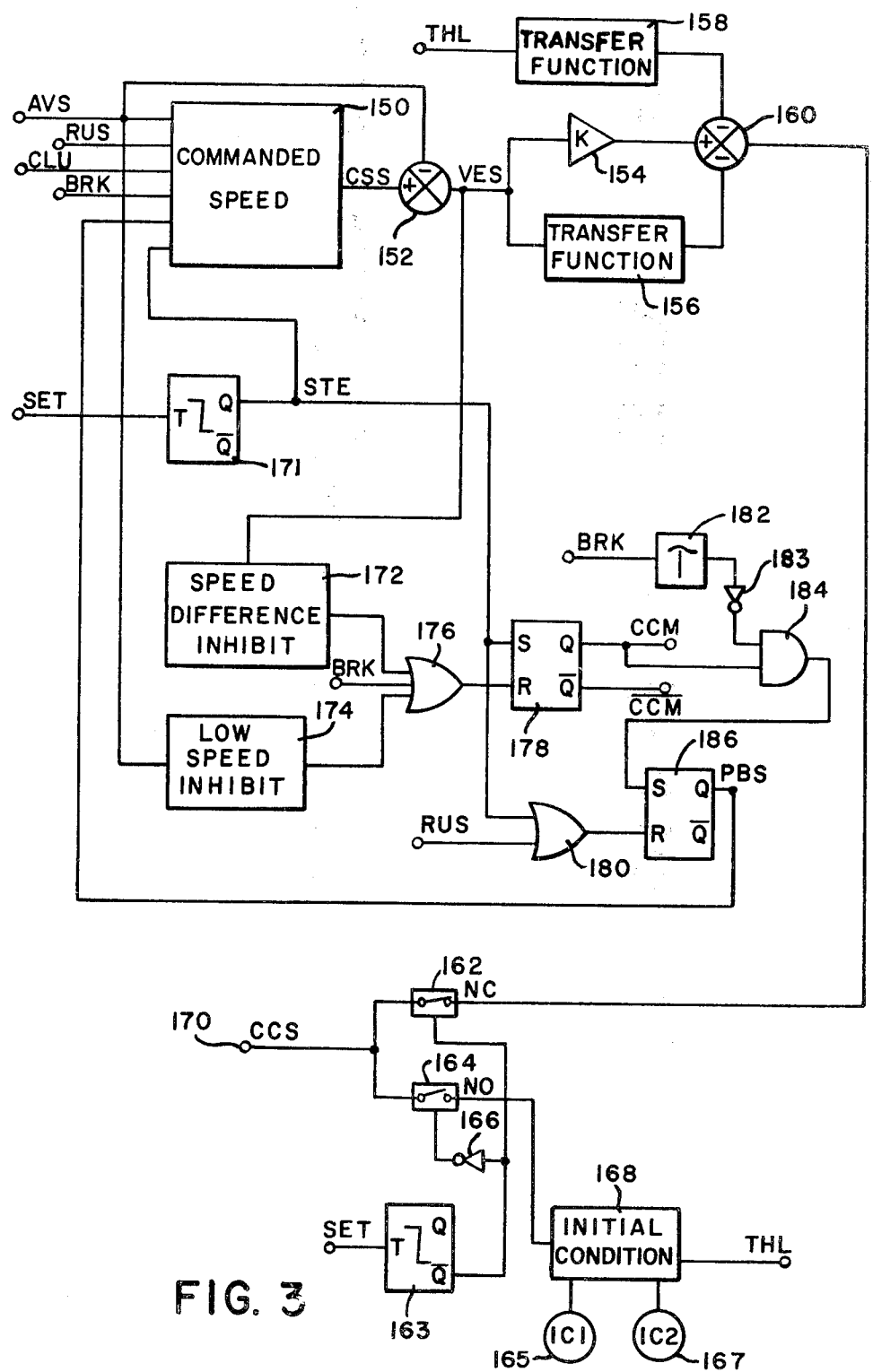
FIG. 3 is a detailed schematic logic diagram of the cruise control circuit illustrated in FIG. 2.

The cruise control circuit will now be more fully explained if attention is directed to the schematic diagram labelled FIG. 3. The cruise control circuit comprises a commanded speed circuit 150 which outputs a commanded speed signal CSS to a summation device 152. The actual velocity signal AVS is additionally input to the summation device and their difference is used to provide a velocity or speed error signal VES.

The VES signal is input to a second summing junction 160 through a proportional loop having a proportional amplifier 154 with an amplification factor K. In another loop the VES signal is operated on by a transfer function circuit 156 which inputs a negative feedforward error signal to the summation device 160. The transfer function 156 is a lead-lag function providing a fast high gain for changes in the speed error which decays with the time constant of the lag. The position of the throttle is represented by the THL signal input to a similar transfer function circuit 158 which forms another negative feedback term algebraically summed in the summation device 160. The transfer function circuit 158 is additionally a lead-lag function providing a high fast gain for changes in the THL signal which decays with time.

The transfer functions in the circuits 158 and 156 are similar but have different time constants and gains. The transfer functions for circuits 156, 158 are illustrated in FIGS. 3a and 3b where s is the Laplace operator in the frequency domain, T1, T2 are the respective time constants, and K1, K2 are the respective gains. A circuit implementation of these functions is conventional and shown in FIG. 3c. The response of the circuits to a step input voltage V shown in FIG. 3d is initially a differentiation dV/dt which is multiplied by the gain K. After the initial peak is obtained, the signal decays at the rate of the time constant as shown in the wave form of FIG. 3e.

Returning now to FIG. 3, the transfer function circuits 156, 158 form history feedforward and feedback terms of the changes in the speed error and throttle position, respectively. The history terms decay with their individual time constants. When algebraically combined in summation junction 160 these terms form negative feedback signals to limit the extent of the proportional term of the error signal. Therefore, the control law of the cruise control circuit is essential to a proportional law based on speed error which is modified by these terms.

If the speed error signal begins to change too rapidly transfer function circuit 156 initially begins to limit the output of summation device 160. If the control signal output from summation device 160 is still excessive then transfer function circuit 158 will secondarily limit the speed at which the throttle member is moved by the pneumatic actuator. Generally speaking, circuit 156 has a larger gain than circuit 158 and a longer time constant.

Figure 3F:
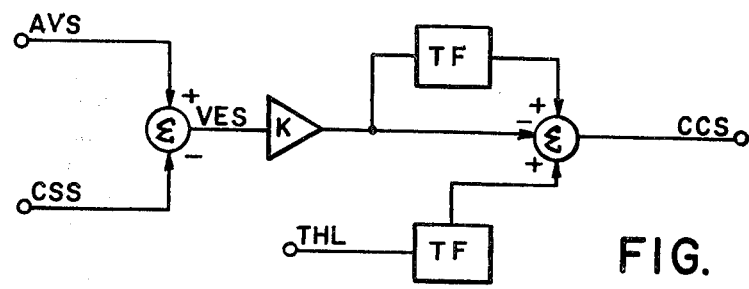
FIG. 3f is a detailed schematic of a second circuit implementation of the control law illustrated in FIG. 3.

In FIG. 3f there is illustrated another implementation of the basic control function shown in FIG. 3. This embodiment is identical in function to that of the FIG. 3 and contains the same blocks including summing junctions 152, 160, a block 154 with gain K, and transfer function blocks 156, 158. It has identical input signals AVS, CSS and an identical output signal CCS and can be connected in place of the blocks in FIG. 3. The only differences in this implementation are that the transfer functions for blocks 156, 158 are implemented differently and the sign on the summing junctions have been reversed. It is seen also that the VES signal is multiplied by a gain before being input to the transfer function circuit 156, but the gain of the transfer function circuit may be adjusted accordingly to produce the same output signal.

The new transfer function blocks are better described with reference to FIG. 3h, 3i where summing junctions 193, 198 receive a positive input I and generate an output O after multiplication by gain terms K1, K2, in blocks 190, 199, respectively. The summing junctions also receive negative feedback inputs from inverse Z-transforms 192, 197 and positive feedback inputs from inverse Z-transforms 194, 201. The positive outputs from Z-transforms 194, 201 are multiplied by gain terms T1, T2 in blocks 195, 200 before being input to the summing junctions. It is seen that the transfer functions 156 (3h), 158 (3i) are identical to each other except for the gain terms K1, K2, T1, T2. These transfer functions, in the incremental domain, are alternative representations of the transfer functions shown in the frequency domain in FIGS. 3a–e. By varying the gains in these implementations the same lead-lag response described for the previous implementation can be emulated.

Figure 3G:
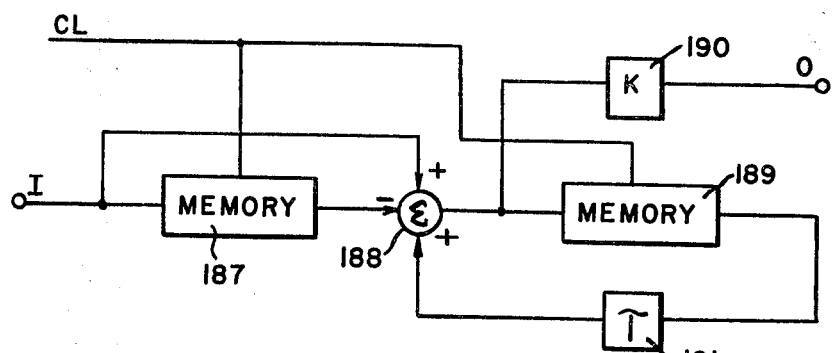
FIG. 3g is a detailed electrical schematic of a circuit implementation of the transfer function circuits illustrated in FIG. 3f.
Figure 3H:
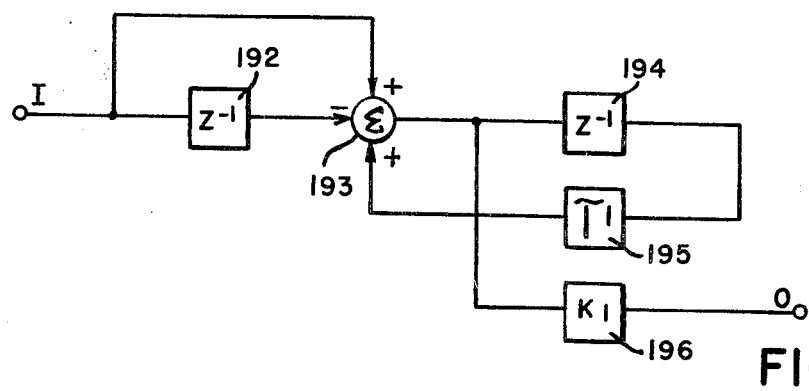
FIGS. 3h and 3i are pictorial representations in Z-transform notation of specific implementations of the transfer function circuits illustrated in FIG. 3.
Figure 3I:
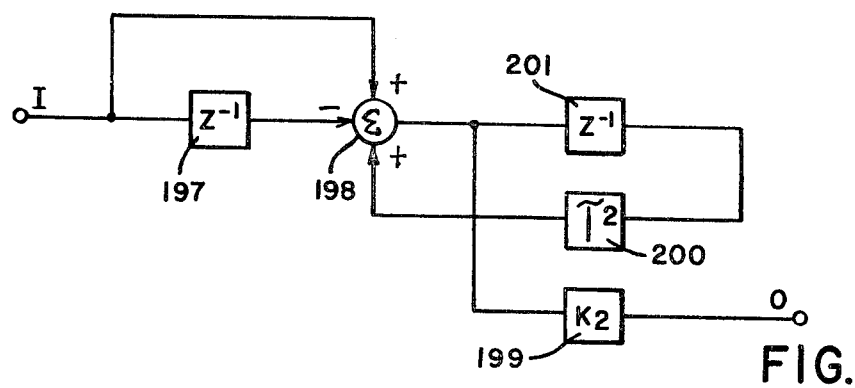

FIG. 3g illustrates a circuit implementation for the Z-transform transfer functions in FIGS. 3h and 3i. A summing junction 188 has an input I and generates an output which is multiplied by a gain K in multiplier 190 to become the final output O. It is evident that K can correspond to either K1 or K2 for the transfer functions in FIGS. 3h and 3i. The summing junction receives another negative input from a memory 187 which is connected to the input I. Another input to the summing junction is received from a multiplier 191 with a gain T which is connected to the output of another memory circuit 189. It is evident that the gain T corresponds to the time constants T1, T2 in circuits 3h and 3i. Input for the memory is from the output of the summing junction 188. The memories 187, 189 are synchronous and have an input from a clock signal CL which transfers information into and out of the memories simultaneously.

In operation, the circuit in FIG. 3g would receive an input (either the VES signal of THL) and store it in memory 187 for one sampling interval. On the next clock signal CL the memory will output the stored signal to the summing junction 188. At the same time the memory 187 will store the present input. The summing junction 188 thus subtracts the previously memorized input from the present input.

Similarly, the output of the summing junction 188 for the previous period will have been stored in a memory 189 to be read out upon the next clock signal. The output of the memory 189 is multiplied by the gain T in multiplier 191 and then added to the other inputs of the summing gunction 188. Thus, the memories 187, 189 are sample and hold circuits or digital registers that delay their respective input signals one sample period. With the negative and positive feedback this circuit will perform the Z-transform functions described for FIGS. 3h and 3i.

This implementation is useful for digital controllers or those which are microprocessor implemented. It operates in the discrete incremental domain and can be converted easily into either of these types of controllers. The frequency of the clock signal CL is determined by the response desired from the circuit. Higher clock rates will provide more of a continuous function for the system while slower clock rates will lower system response. If the system is implemented in a microprocessor form, the clock signal CL may be generated as a portion of the internal generated timing. For example, each time a main program loop is executed the memories or registers 187, 189 will perform their respective store and output cycle.

In this manner an advantageous digital or discrete incremental domain implementation of the basic control function has been described in detail. It will also be evident that implementations other than incremental and frequency domain systems can be utilized to form the invention.

The output of the summation circuit 160 becomes the cruise control signal CCS output from terminal 170 after passage through a normally closed switch 162. A normally open switch 164 is commonly connected at terminal 170 with switch 162 to present an initial condition value for the cruise control signal CCS. The switches 162, 164 are alternately closed and opened by the Q pulse output of a monostable 163 being applied to their control terminals. The pulse is generated in response to the falling edge of the set signal SET received at the T input of monostable 163 and is of a predetermined duration.

While the pulse is present switch 162 is opened and switch 164 is closed thereby applying the voltage output from an initial condition circuit 168 to the terminal 170. The initial condition circuit receives initial condition voltage IC1 input from voltage source 165 respectively, and compares it to the actual throttle position to set the initial placement of the throttle member. Another initial condition voltage IC2 from source 167, can be connected depending on which governor the engine is operating under. The output of the initial condition circuit therefore moves the throttle member in a direction to equalize the signals THL and IC1. The time constant of the monostable is designed such that the initial condition circuit will be operable to move the throttle member to its initial position before control is turned over to the cruise control law. Preferably, the time constant is in the order of one half a second.

The cruise control circuit further generates the cruise control mode signal CCM from the output of an RS flip flop 178. The flip flop 178 is set by a set enable signal STE from a monostable 171. The monostable 171 generates a short pulse on the falling edge of the set signal SET which is input to its trigger terminal T. The set enable signal STE is also input to the commanded speed circuit 150 and its operation in that circuit will more fully described hereinafter. The cruise control mode flip flop 178 is reset via a high level transition from the output of OR gate 176. The OR gate has inputs from the output of a speed difference inhibit circuit 172 and a low speed inhibit circuit 174 or brake signal BRK. High level transitions on the output of these circuits will reset the cruise control flip flop to terminate this mode of the system.

The input to the speed difference inhibit circuit 172 is the velocity error signal VES. The circuit 172 receives the VES signal and compares it to a set reference. If the velocity error is greater than the reference, then circuit 172 produces a high level to reset the cruise control flip flop.

Similarly, the low speed inhibit circuit 174 receives the actual velocity signal AVS and compares it to a predetermined reference. If the actual velocity signal is below the reference then the low speed inhibit circuit will produce a high level to reset the cruise control flip flop 178.

The speed difference inhibit is to prevent the controller from operating in cruise mode if the speed error is excessive. This is a safety feature that allows the controller a range of speed errors preferably +20 mph in which to work that will take into account gearing changes when climbing or descending hills. However, if the speed difference is greater than the range, the controller will turn speed regulation of the vehicle over to the driver. In a similar manner, if the actual velocity of the vehicle is not greater than a lower limit (preferably 20 mph) then the cruise control mode of operation will be terminated.

Both inhibit circuits may comprise a voltage comparator circuit with a voltage reference representative of the particular constant value chosen. Such circuits are conventional and have been shown only in block form.

An additional flip flop 186 generates a prior brake signal PBS from its Q output. The flip flop 186 is set via a high transition from the output of an AND gate 184. The inputs to the AND gate are the cruise control mode signal CCM and the brake signal BRK after a delay through the circuit 182. The prior brake flip flop 186 is reset by a high level output from OR gate 180. The OR gate 180 receives as one input the set enable signal STE and as the other resume signal RUS. The prior brake signal PBS is used in the commanded speed circuit 150 as will be more fully described hereinafter.

Figure 4:
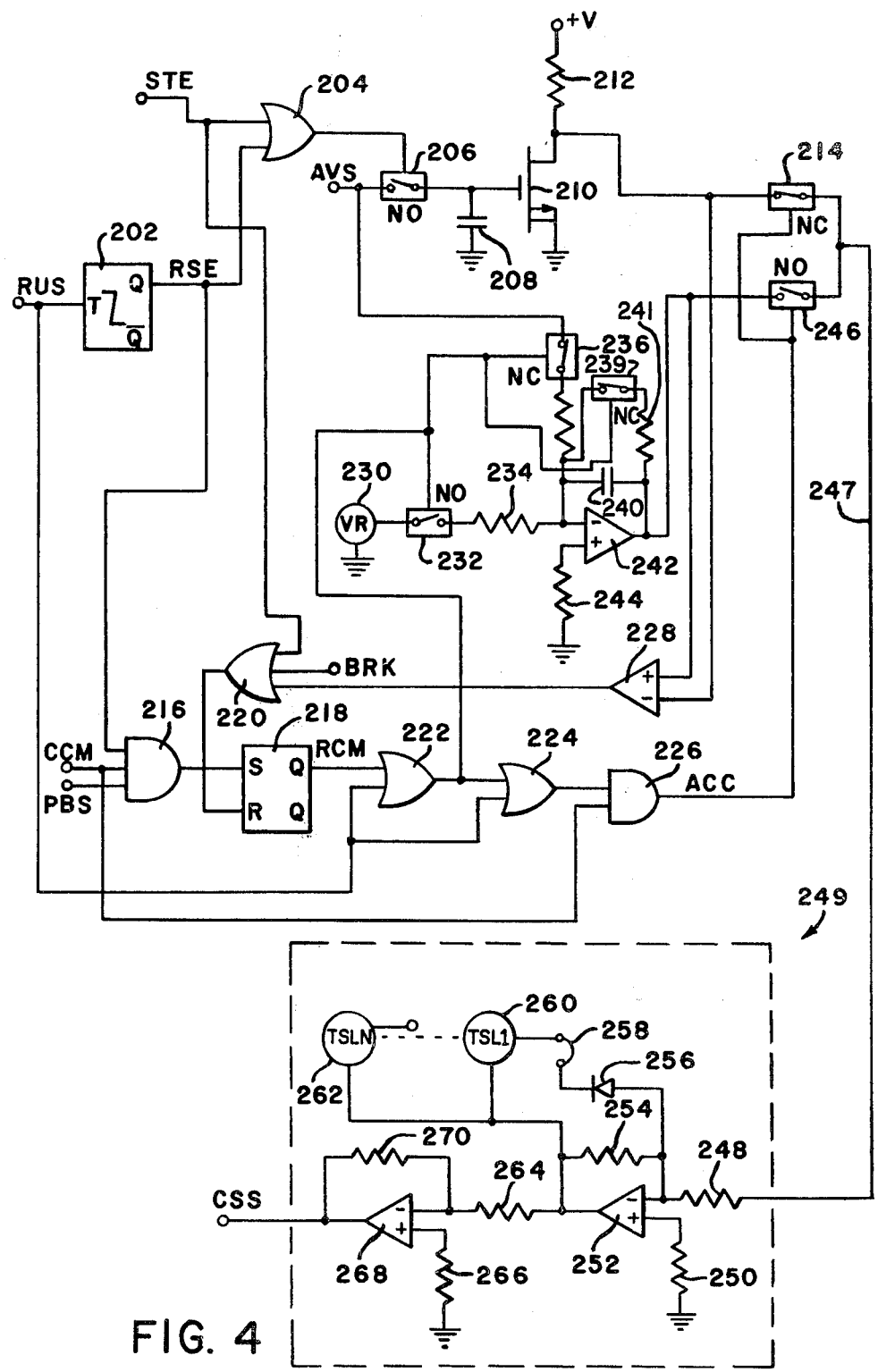
FIG. 4 is a detailed electrical schematic diagram of the commanded speed circuit illustrated in FIG. 3.

The commanded speed circuit 150 is shown in greater detail in FIG. 4 and includes a top set limit circuit that will limit the signal CCS to a predetermined value even if the operator or the system requests a greater speed. The commanded speed signal circuit comprises basically a memory element operable to store the actual velocity signal AVS. The memory element in this particular embodiment is illustrated as a capacitor 208 connected commonly with the gate terminal of a FET 210 and to one signal terminal of a normally open switch 206. The actual velocity signal AVS is connected to the other terminal of the switch 206. When the switch is closed the AVS signal is memorized on the capacitor 208. The high input impedance of the FET prevents the charge from leaking from the capacitor 208.

However, the voltage on the capacitor controls the channel impedance of the FET 210 to provide a representative voltage at the output of the source terminal. The FET has its source terminal connected to a supply voltage +V through resistor 212 and its drain terminal connected to ground. The connection of the FET is therefore a common drain configuration and acts as a voltage amplifier for the voltage stored on capacitor 208.

The switch 206 is momentarily closed by a short pulse from the output of an OR gate 204. The pulse closes the switch 206 long enough to memorize the AVS signal on the capacitor and then allows the switch to open to prevent draining the voltage away from the capacitor. In this configuration the OR gate 204, switch 206, capacitor 208 and FET amplifier operate as a sample and hold circuit to memorize the actual velocity signal AVS.

Momentary control pulses to the input of the OR gate 204 for the purpose of memorizing the actual velocity signal AVS are the set enable signal STE and the resume enable signal RSE. The resume enable signal RSE is a pulse produced by the monostable 202 upon the falling edge of the resume signal RUS. As previously described, the set enable signal STE is a pulse produced by the monostable 171 (FIG. 3) on the falling edge of the set signal.

The resume mode circuitry will now be more fully explained with reference to a ramp rate generator 242 and a resume control flip flop 218. The resume function is basically provided by an operational amplifier 242 connected as an integrator or ramp rate generator. The amplifier has a feedback capacitor 240 connected between its output and inverting input and additionally has its noninverting input connected to ground through a resistor 244. An input resistor 234 is further connected at the inverting input by one of its terminals and is connected to a normally open switch 232 by its other terminal. The switch 232 is additionally connected to a predetermined voltage reference VR, 130 to produce a reference level to integrate when the switch 232 is closed. The integrator will therefore ramp at a predetermined rate when switch 232 is closed from whatever initial voltage is on capacitor 240. The ramp rate of the integrator is the predetermined acceleration rate for the vehicle in the resume or accelerate mode.

The initial condition on the capacitor 240 and thus on amplifier 242 is provided by the series combination of a normally closed switch 236, a resistor 238, a normally closed switch 239, and a resistor 240. The combination is connected between the AVS signal and the output of the amplifier 242 with an additional connection at the junction of the switch 239 and resistor 238 to the inverting input of amplifier 242. In this manner when the switches 236, 239 are closed, the amplifier 242 is a unity gain amplifier with an output equivalent to AVS.

The switch 232 is closed, and switches 236, 239 opened, in response to a high level on the output of an OR gate 222. The high level on the output of OR gate 222 is produced either by the inputs of a resume control mode signal RCM from the Q output of a resume control mode flip flop 218 or from the input of the resume signal RUS directly. The resume control flip flop 218 is set by a high level output from an AND gate 216. The inputs to the AND gate 216 necessary to produce the high level output are the positive levels of the resume enable signal RSE, the cruise control mode signal CCM, and a prior brake signal PBS.

The resume control mode flip flop 218 is reset by the high level transition of an OR gate 220. Conditions for resetting the flip flop are the high level transitions of the brake signal BRK, the set enable signal STE, or the output of a comparator 228. The comparator 228 produces a high level output when the memorized actual velocity signal is less than or equal to the velocity signal commanded by the resume rate generator 242.

The commanded velocity signal produced by the rate generator is output via signal line 247 depending upon the output of AND gate 226. Normally AND gate 226 has a low output level and thus normally closed switch 214 connects the memorized actual velocity signal to the signal line 247. However, when the gate 226 transitions to high level the normally closed switch 214 opens and a normally open switch 246 closes. Upon closure of the normally open switch 246 the velocity signal generated by the rate generator 242 is applied to signal line 247.

The commanded speed signal CSS developed on signal line 247 is transmitted through a top set limit circuit 249 comprising the circuitry shown in the dotted block. The top set limit circuit is basically a pair of inverting amplifiers of unity gain connected together to transmit the commanded speed signal without modification or inversion if it is less than a limit value.

The first unitary gain amplifier comprises an operational amplifier 252 with a pair of identical gain resistors 248 and 254. The resistor 254 is connected between the output of the amplifier 252 and the inverting input of the amplifier. The inverting input of the amplifier 252 is further connected to the input signal line 247 through the resistor 248. The noninverting input of the amplifier 252 is connected through ground through a resistor 250. Similarly, the output of the amplifier 252 is connected to the inverting input of the second unity gain amplifier via resistor 264. A feedback resistor 270 is connected between the inverting terminal also and the output terminal of the operational amplifier 268. The operational amplifier has its noninverting input connected to ground through a resistor 266.

The gain of the first amplifier is modified when the top set limit is exceeded. The limiting action is provided by a parallel connection of a clamping circuit with the gain resistor 254. The clamping circuit comprises in series a diode 256, a jumper 258, and a voltage 260 described as the first top set limit TSL1. When the input to the amplifier 252 exceeds the voltage TSL1, the diode 256 will begin to conduct in the forward direction and limit the output of the amplifier 252 to a set value. Other top set limits TSL1-TSLN as illustrated by the dotted line and source 262 can be connected to the output of the amplifier 252 depending upon the position of the jumper 258.

This circuit in operation permits the commanded speed signal on signal line 247 to pass unmodified until it attains the voltage level of the top set limit jumpered into the circuit. At that point the output terminal is clamped on the top set limit no matter whether the operator demands a greater CSS signal or the system demands a greater CSS signal.

It is evident however, that the top set limit circuit 249 can also be disposed between the AVS signal and the inputs to either or both the ramp rate generator and the memory means. This alternative embodiment is illustrated in FIG. 4a. Other combinations of the circuit are available where either the input or output of only one of the CCS signal generators is limited and the other is not.

The operation of the cruise circuit will now be more fully disclosed. Initially assume that the operator of a vehicle is traveling at a certain rate of speed on a fairly even road and set load. If he desires to hold that particular actual speed he momentarily depresses the set button 34 generating the set signal SET. The trailing edge of the SET signal generates the STE pulse from the monostable 171 to first set the cruise control flip flop 178 and secondly to store the actual velocity signal AVS in capacitor 208. The initial positioning of the throttle is also accomplished at this time.

Since the output of the AND gate 226 is low and therefore switch 214 is closed, the actual velocity signal on the capacitor 208 becomes the commanded speed signal CSS after passing through the top set limit circuit 249. The actual velocity signal is subtracted from the commanded speed signal CSS to yield the speed error signal VES. The error signal VES is operated on by the control block as previously described to generate the cruise control signal CCS at terminal 170 and thereby regulate the throttle actuator to reduce the error. The cruise control circuit will regulate the speed of the vehicle to maintain the value stored in the memory means until the cruise control mode flip flop 178 is reset. A reset occurs if the speed difference becomes too great, as sensed by circuit 172, the actual velocity of the vehicle becomes too low, as sensed by the low speed inhibit circuit 174, or the brake signal BRK is applied. The OR gate 176 senses any of these conditions and resets the cruise control flip flop 178 if any of them occur.

The resume control mode will now be more fully described where the system will accelerate to a previously remembered commanded speed signal subsequent to braking. The system is directed into this mode of operation when the cruise control mode flip flop is set and a brake signal BRK indicating that the vehicle is being slowed is applied. These two signals are combined in the AND gate 184 to set the prior brake flip flop 186. The prior brake flip flop 186 generates the PBS signal to the AND gate 216 where with the cruise control mode signal and the resume enable signal combine to set the resume mode flip flop 218. The resume enable signal RSE is developed when the operator, after application of the prior brake, wishes to accelerate back to the previous cruise condition stored on the capacitor 208. Therefore, to initiate the mode, the operator momentarily depresses the resume button.

This acceleration operation is accomplished automatically under the control of the RCM signal generated through the OR gate 222 to the switches 232 and 236. The RCM signal opens switch 236 and closes switch 232. The initial voltage on the capacitor 240 of the ramp rate generator is the actual velocity signal AVS. The ramp rate generator then ramps at its predetermined rate dependently upon the voltage reference VR 130 to generate the CSS signal until the resume mode flip flop 218 is reset. During this time the controller is following the ramping voltage of the ramp rate generator to accelerate the vehicle toward the memorized speed. Once the ramp rate voltage exceeds the memorized value as sensed by the comparator 228 the resume control mode flip flop is rest through the OR gate 220. If during this operation the brake signal BRK becomes present the resume control mode flip flop will be reset and the mode terminated. Further, if the operator wishes instead to set another commanded actual velocity signal in the memory, then a momentary depression of the set button will cause the STE to be generated through the OR gate 220 and reset the resume control mode flip flop.

To accelerate the vehicle to any desired speed below the top set limit the resume switch is depressed and held until the desired speed is obtained. This operation generates a resume signal RUS through OR gate 224 which in combination with the cruise control mode signal CCM generates the acceleration signal ACC to the switches 214 and 246. The closure of the switch 246 switches control of the commanded speed signal CSS to the ramp rate generator. Holding in the resume button also closes switch 232 to generate an acceleration voltage ramp from the present actual velocity stored on the capacitor 240. The controller will follow the increasing CSS signal to accelerate the vehicle. When the operator has accelerated the vehicle to where he desires, then the release of the resume button will generate the RSE signal from the monostable 202 to memorize the actual velocity in the capacitor 208 by momentarily closing the switch 206. At this time the system will continue in cruise control at the newly memorized speed.

In either the resume or accelerate mode the increase in speed per unit time is determined by the ramp rate of the resume control circuit. This rate can be programmed to be low enough so that the vehicle will not break traction on wet or icy pavements during these modes. This requires knowledge of the coefficient of friction between the driving members (wheels) and the surface (pavement), during the condition for which protection is sought. Also, the standard weight of the vehicle and type must be factored into the equation. Thus, the ramp rate will be different for changes in sizes and type of vehicles. However, it has been found that a nominal acceleration rate of 0.5 mph/sec is advantageous for the common tractor of a tractor-trailer combination.

If the operator wishes to decelerate, the set button is depressed and held stationary. This causes the pressure level in the plenum 23 to be decreased and decelerate the vehicle to where the operator desires. At that point when the set button is released the STE signal is generated by the monostable 171 on the falling edge and operates the switch 206 to memorize the actual velocity at that moment. The controller will then, as previously described, maintain the desired cruise control speed.

Figure 5:
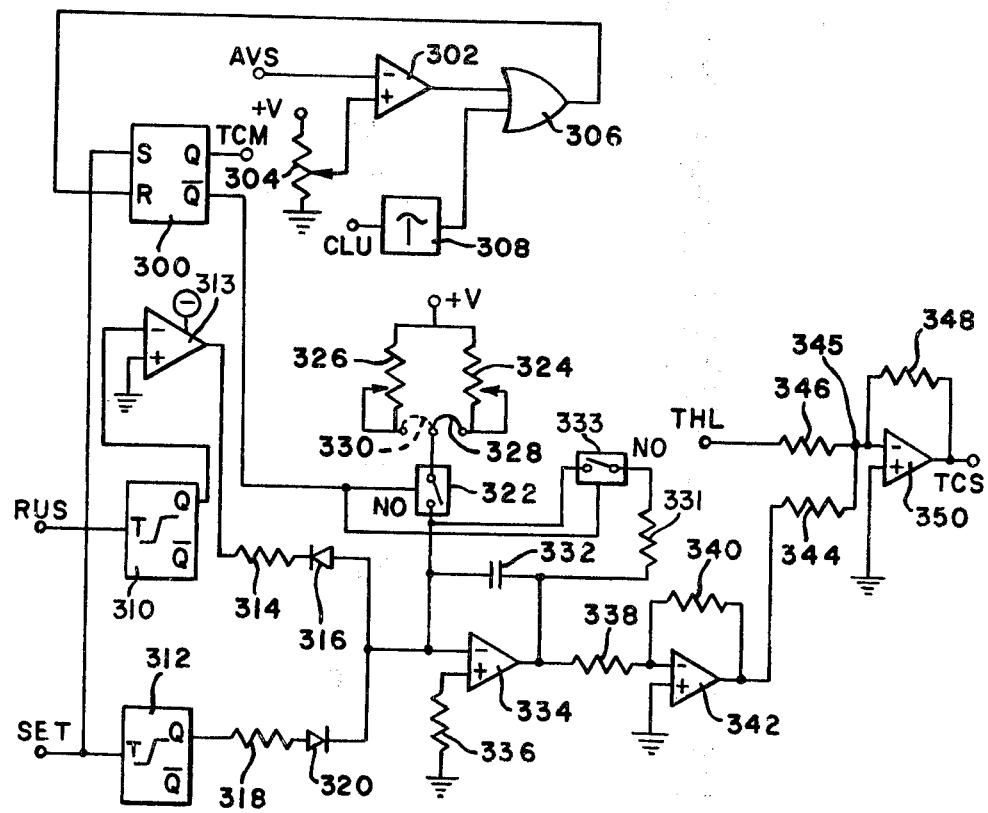
FIG. 5 is a detailed electric schematic diagram of the throttle control circuit illustrated in FIG. 2.

The throttle control circuit will now be more fully disclosed with respect to FIG. 5. The throttle control circuit includes generally a proportional controller which takes the difference between an actual throttle position as input by the throttle position signal THL via resistor 346 and a commanded throttle position input signal via a resistor 344 to a summing junction 345. The difference or error is amplified by the gain of the operational amplifier 350 to become the throttle control signal TCS. The gain of the amplifier 350 is determined by the values of the resistances 344, 346, and 348.

The commanded throttle position signal is generated as the output of operational amplifier 334 which is configured as an integrator or ramp rate generator. The amplifier 334 has an integrating capacitor 332 connected between its output and inverting input. A pulse input to the integrating capacitor 332 is provided via a series combination of a resistor 314 and a diode 316 connected between the inverting input of the amplifier and the output of a negative polarity inverter 313. The inverting input of the inverter 313 is connected to the Q output of a monostable 310 and its noninverting input is connected to ground. Another pulse input is provided through the serial combination of a diode 320 and resistor 318 connected between the inverting input and the Q output of a monostable 312. The monostables 310 and 312 produce pulses of a predetermined duration upon the rising edge of the SET and RUS signals, respectively.

The capacitor 332 has an initial condition voltage impressed upon it via switches 322, 333, and resistor 331, which are connected to a voltage source +V via the serial combination of a jumper 328 and a potentiometer 324. The initial voltage is representative of the initial throttle position increment. Another initial increment can be used by changing jumper 328 to the position 330. In this position potentiometer 326, connected to the supply +V, will provide a different initial throttle increment from idle to allow the utilization of a different governor. With switches 332, 331 closed, the amplifier 334 has a unity gain and an initial voltage determined by the potentiometer setting. This initial voltage is either subtracted from or added to by pulses from the monostables 310, 312.

The monostable 310 is connected such that the polarity of the diode 316 will subtract increments of voltage away from the capacitor 332 when the monostable is triggered. Conversely, the monostable 312 is connected by virtue of the polarity of diode 320 to add increments of voltage to the capacitor when the monostable 312 is triggered.

The initial condition for the integrator 334 is impressed on the capacitor 332 by a high level of the Q output of a throttle control mode flip flop 300. The throttle control mode flip flop generates the throttle control mode signal TCM when it is set by the rising edge of the RUS signal.

The throttle control mode flip flop 300 is reset by a high output from the OR gate 306. This high level may be generated either from the clutch signal CLU after it is delayed by a delay circuit 308 or by the high level of the output of a comparator 302. The comparator 302 provides a high output level if the input to its inverting terminal is greater than a predetermined reference voltage received at its noninverting terminal. The reference voltage is developed from potentiometer 304 representative of an actual vehicle velocity of zero. The input to the inverting terminal is the actual velocity signal AVS which is compared to the reference.

The operation of the throttle control circuit is as follows. If the vehicle is stationary and the resume button is momentarily depressed, the vehicle will operate in the throttle control mode by setting flip flop 300. The comparator 302 through OR gate 306 immediately resets the flip flop if the actual velocity of the vehicle is greater than zero.

Assuming no reset is present, the flip flop 300 generates the TCM signal to transfer control of the system to the throttle control circuit as previously described. The initial increment of throttle position, a predetermined percentage of full throttle, stored on the capacitor 332 is transmitted to the summing junction of amplifier 334. The voltage is inverted by the unity gain amplifier 342 to provide the correct polarity for combination in the summing junction.

At the summing junction, the error signal is formed and amplified by operational amplifier 350 to become the TCS signal. The throttle member is controlled by the TCS signal to reduce the error by negative feedback of the THL signal.

If the operator desires a higher engine speed than the initial increment, he will momentarily depress the resume button adding an increment of voltage to capacitor 332. If he desires to lower the engine speed a step, the operator will momentarily depress the SET button. This action will decrement the voltage stored on capacitor 332. Once a new voltage is impressed on the capacitor, the proportional loop will regulate the position of the throttle to equalize the THL signal with that voltage. This stair step voltage generation with an unequal first increment provides a facile method of throttle position control when the system is operating in this mode.

Figure 6:
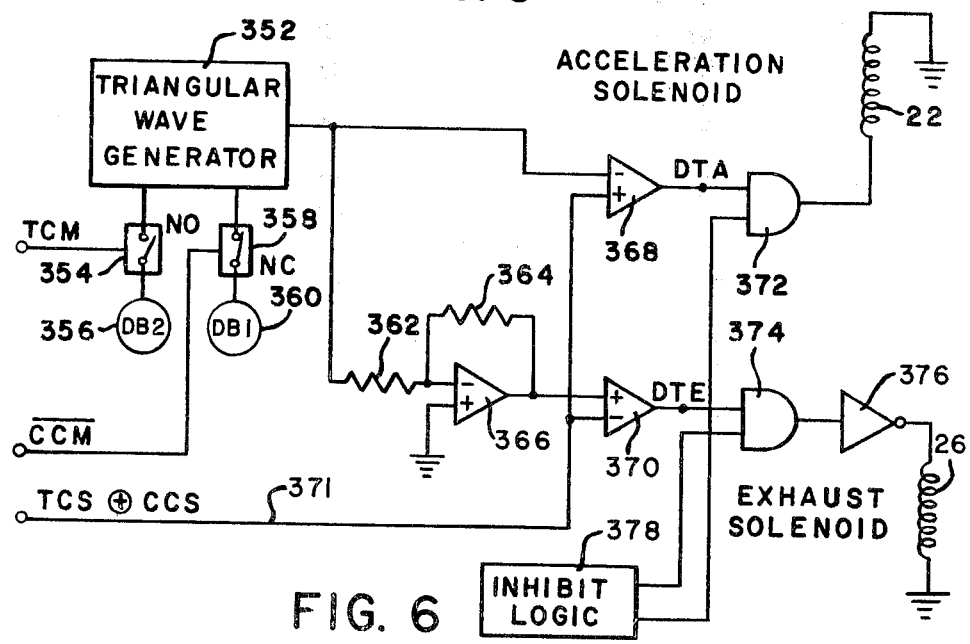
FIG. 6 is a detailed electrical schematic diagram of the duty cycle translator and output logic illustrated in FIG. 2.

The duty cycle translator will now be more fully described with reference to FIG. 6 and waveforms 7a—d. The translator includes a conventional triangular or sawtooth wave generator 352. The generator provides a triangular shaped wave having maximum and minimum values but with its minimum value offset from a zero or reference point by a predetermined amount, as best illustrated by reference to waveform 400 in FIG. 7a. Assuming that the nominal value of the signal generated by the triangular wave generator 352 is represented by the line 402. It will be noted that the minimum values 404 of the waveform 400 are offset from the nominal by a predetermined amount represented by a dead band DB1. As best seen in FIG. 7c, the signal 400 can be inverted to form a signal 406 of negative polarity which is similarly offset from a zero value 408 by a corresponding offset DB1.

The inversion of the waveform 400 is accomplished by an operational amplifier 366 connected as a unity gain inverting amplifier. The amplifier 366 has its noninverting terminal connected to ground. A pair of feedback resistors in series 362 and 364 are connected between the output of the amplifier 366 and the output of the wave generator 352. The junction of the resistors is connected to the inverting input of the amplifier 366.

The triangular waveform generator 352 includes a voltage offset 356 which is connected through a switch 354 to an input. The switch 354 is a normally open switch which is closed by the high level of the throttle control mode signal TCM. Similarly, the triangular waveform generator 352 receives another voltage DB1 which is presented to an input through a normally closed switch 358. The switch 358 is opened in response to the inversion of the cruise control mode signal CCM.

The voltages DB1 and DB2 provide offsets for the triangular wave generator depending upon the control mode of the system. If operating in a cruise control mode the triangular waveform will be offset a position DB1. However, if operating in a throttle control mode the triangular waveforms will be offset from the zero level a distance DB2. It is noted DB2 is less than DB1 to provide a finer positioning of the throttle member during throttle control mode.

The output of the triangular waveform generator 352 is fed directly into the inverting input of a comparator 368 while the inverted output is fed to the noninverting input of a comparator 370. The non-inverting input of the comparator 368 and inverting input of comparator 370 are connected commonly to the signal line 371 which inputs either the throttle control signal TCS or the cruise control signal CCS depending upon the mode of the system. The throttle control signal TCS or cruise control signal CCS is represented by waveform 410 in FIG. 7a and 412 in FIG. 7c. The comparisons with the output of the triangular waveform generator and its inversion form the duty translator accelerator signal DTA and duty translator exhaust signal DTE. The DTA signal is shown as waveform 414 in FIG. 7b and the DTE signal is shown as waveform 416 in FIG. 7d.

The DTA signal is transmitted through an AND gate 372 to energize the coil 22 of the acceleration solenoid. The DTE signal is transmitted through an AND gate 374 and inverter 376 to energize the coil 26 of the exhaust solenoid. Inhibit inputs to each of the AND gates 372 and 374 are generated by an inhibit logic circuit 378 to prevent transmission of the signals DTA and DTE during certain conditions. Preferably, two of the inhibit conditions that may be used are the clutch and brake signals CLU, BRK.

While a preferred embodiment of the invention has been shown and described it will be obvious to those skilled in the art that there are modifications and changes that may be made thereto without departing from the spirit and scope of the invention as hereinafter defined by the following claims.

I claim:

1. An automatic speed control for a vehicle comprising:
    means for generating an actual speed signal proportional to the actual speed of the vehicle;
    means for generating a commanded speed signal proportional to the desired speed of the vehicle;
    means for generating a speed error signal proportional to the difference between said actual and commanded speed signals;
    means for generating a control signal as a function of said speed error signal wherein said control signal regulates said actual vehicle speed to reduce said error signal; and
    means for limiting the commanded speed signal to a set value when it exceeds a predetermined limit, said limiting means including means for comparing said commanded speed signal with said predetermined limit, for transmitting the commanded speed signal unmodified if the command speed signal is less than the limit, and for transmitting said set value as the commanded speed signal if the commanded speed signal is in excess or equal to the limit, wherein said comparing means includes a unity gain amplifier having at least one gain resistance which is variable to change the gain of the amplifier and means for changing the gain of the amplifier when said commanded speed signal is greater than or equal to said predetermined limit.

2. An automatic speed control system as defined in claim 1, wherein said gain changing means includes:
    a series combination of a diode and a voltage reference connected in parallel with said gain resistance.

3. An automatic speed control system as defined in claim 2, wherein:
    said diode is poled such that the voltage across said parallel combination cannot exceed said reference voltage.

4. An automatic speed control as defined in claim 1 further including:
    means for generating a resume speed signal to accelerate the vehicle at a predetermined rate in response to a command by the operator.

5. An automatic speed control as defined in claim 4, wherein:
    said predetermined rate is less than the acceleration which would cause loss of traction in the vehicle.

6. An automatic speed control system for a vehicle comprising:
    means for generating an actual speed signal proportional to the actual speed of the vehicle;
    means for generating a commanded speed signal proportional to the desired speed of the vehicle, including memory means, receiving the actual speed signal as an input, for storing a value of the actual speed signal in response to a signal indicating that an operator desires that the commanded speed signal be equivalent to the present actual speed of the vehicle;
    means for generating a speed error signal proportional to the difference between said actual and commanded speed signals;
    means for generating a control signal as a function of said speed error signal wherein said control signal regulates said actual vehicle speed to reduce said error signal; and
    means for limiting the commanded speed signal to a set value when it exceeds a predetermined limit, wherein said limiting means is disposed between said actual speed signal generating means and the input to said memory means, whereby said limiting means prevents an actual speed signal greater than said predetermined limit from being stored in said memory means.

7. An automatic speed control system as defined in claim 6 which further includes:
    means, receiving the actual speed signal as an input, for generating a resume speed signal to accelerate the vehicle to a speed value stored in said memory means, subsequent to a brake application.

8. An automatic speed control system as defined in claim 7, wherein said resume speed signal generating means includes:
    means for generating a ramp signal that increases at a predetermined rate to increase said commanded speed signal from said actual speed signal to said speed value stored in said memory means.

9. An automatic speed control system as defined in claim 8, wherein:
    said limiting means is further disposed between said actual speed signal and the input to said resume speed signal generating means.

10. An automatic speed control system for a vehicle comprising:

means for generating an actual speed signal proportional to the actual speed of the vehicle;

means for generating a commanded speed signal proportional to the desired speed of the vehicle, including memory means, receiving the actual speed signal as an input, for storing a value of the actual speed signal in response to a signal indicating that an operator desires that the commanded speed signal be equivalent to the present actual speed of the vehicle;

means for generating a speed error signal proportional to the difference between said actual and commanded speed signals;

means for generating a control signal as a function of said speed error signal wherein said control signal regulates said actual vehicle speed to reduce said error signal;

means, receiving the actual speed signal as an input, for generating a resume speed signal to accelerate the vehicle to a speed value stored in said memory means subsequent to a brake application; and means for limiting the commanded speed signal to a set value when it exceeds a predetermined limit, wherein said limiting means is disposed between said actual speed signal and the input to said resume signal generating means.

11. An automatic speed control system for a vehicle comprising:

means for generating an actual speed signal proportional to the actual speed of the vehicle;

means for generating a commanded speed signal proportional to the desired speed of the vehicle; including memory means, receiving the actual speed signal as an input, for storing a value of the actual speed signal in response to a signal indicating that an operator desires that the commanded speed signal be equivalent to the present actual speed of the vehicle;

means for generating a speed error signal proportional to the difference between said actual and commanded speed signals;

means for generating a control signal as a function of said speed error signal wherein said control signal regulates said actual vehicle speed to reduce said error signal;

means, receiving the actual speed signal as an input, for generating a resume speed signal to accelerate the vehicle to a speed value stored in said memory means subsequent to a brake application; and means for limiting the commanded speed signal to a set value when it exceeds a predetermined limit, wherein said limiting means is connected to receive the output of said memory means and limit the output to said set value when it exceeds said predetermined limit.

12. An automatic speed control as defined in claim 11, wherein:

said limiting means is further disposed to receive the resume speed signal and limit the signal to said set value when the signal exceeds said predetermined limit.

13. An automatic speed control system for a vehicle comprising:

means for generating an actual speed signal proportional to the actual speed of the vehicle;

means for generating a commanded speed signal proportional to the desired speed of the vehicle, including memory means, receiving the actual speed signal as an input, for storing a value of the actual speed signal in response to a signal indicating that an operator desires that the commanded speed signal be equivalent to the present actual speed of the vehicle;

means for generating a speed error signal proportional to the difference between said actual and commanded speed signals;

means for generating a control signal as a function of said speed error signal wherein said control signal regulates said actual vehicle speed to reduce said error signal;

means, receiving the actual speed signal as an input, for generating a resume speed signal to accelerate the vehicle to a speed value stored in said memory means subsequent to a brake application; and means for limiting the commanded speed signal to a set value when it exceeds a predetermined limit, wherein said limiting means is connected to receive the resume speed signal and limit the signal to said set value when the signal exceeds said predetermined limit.

* * * * *